June 8, 1965 P. S. PAINTER 3,187,538
DEVICE FOR PULLING OUT DENTED SHEET METAL PORTIONS
Filed Oct. 4, 1962 2 Sheets-Sheet 1
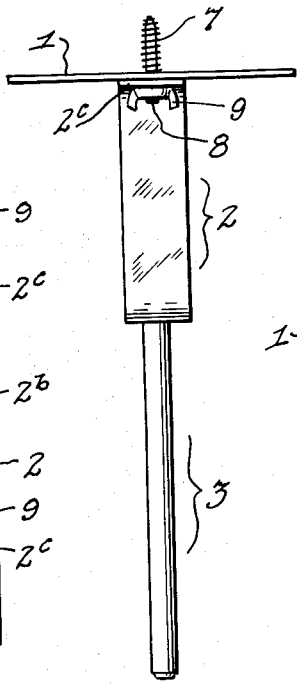
FIG. 1.
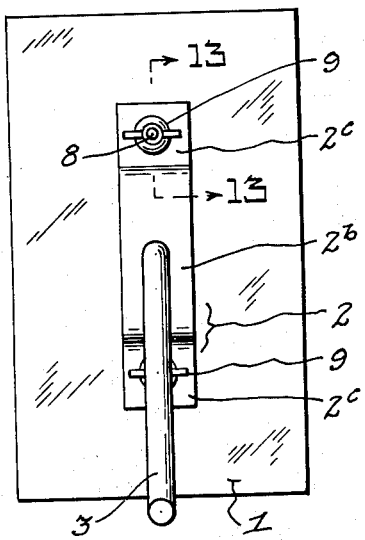
FIG. 2.
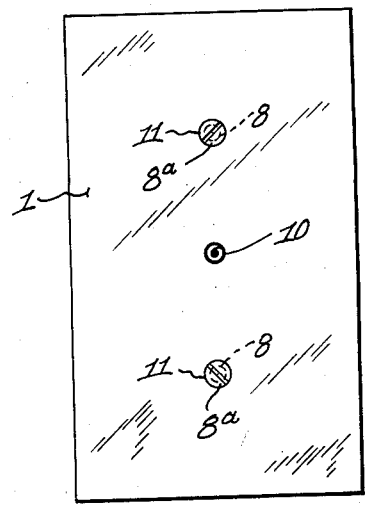
FIG. 3.
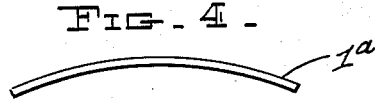
FIG. 4.
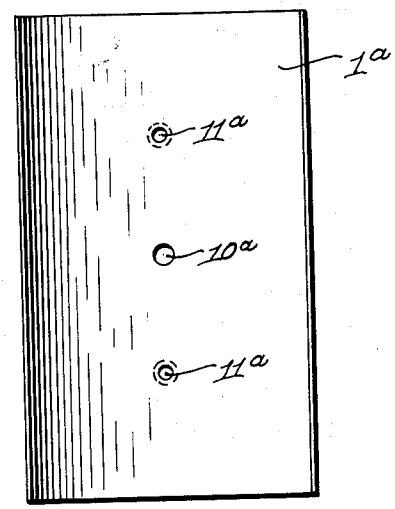
FIG. 5.
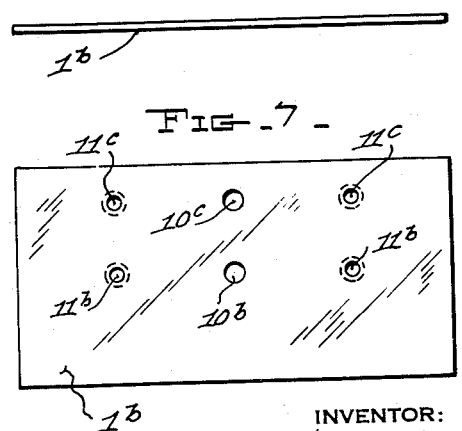
FIG. 6.
FIG. 7.
INVENTOR:
Paul S. Painter,
BY Alfred E. Ischinger
ATTORNEY.

June 8, 1965 P. S. PAINTER 3,187,538
DEVICE FOR PULLING OUT DENTED SHEET METAL PORTIONS
Filed Oct. 4, 1962 2 Sheets-Sheet 2
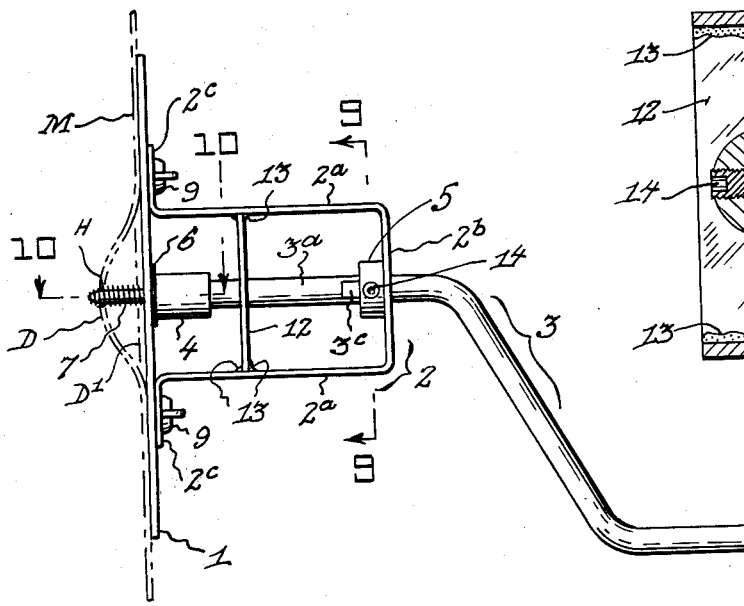
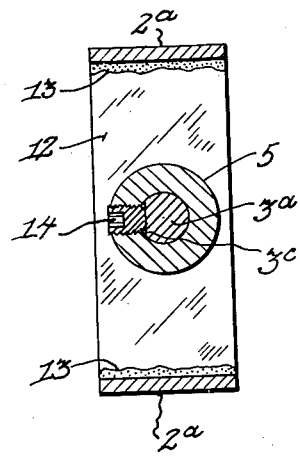
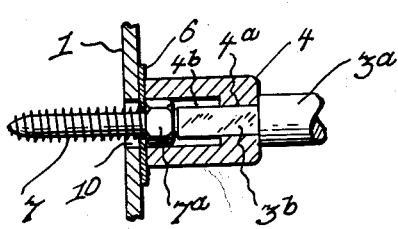
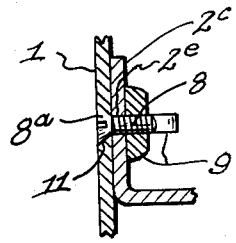
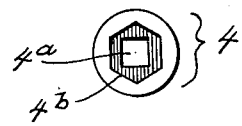
INVENTOR:
Paul S. Painter,
BY
Alfred E. Ischinger
ATTORNEY.

United States Patent Office 3,187,538
Patented June 8, 1965

3,187,538
DEVICE FOR PULLING OUT DENTED SHEET METAL PORTIONS
Paul S. Painter, 331 Hollenbach St., Reading, Pa.
Filed Oct. 4, 1962, Ser. No. 228,412
9 Claims. (Cl. 72—114)

This invention relates to hand tools, and more particularly concerns a unique hand tool or device for pulling out or straightening the accidentally or otherwise dented sheet metal portions of an automobile or the like.

One object of my invention is to provide a novel hand tool or device of the type indicated.

Another object is to provide such a device which has certain structural and functional features of advantage over the similar devices of the prior art.

A further object is to provide such a device which facilitates the procedure of pulling out or straightening of the dented sheet metal portions of an automobile or the like and of restoring said portions to their original condition.

Another object is to provide such a device which makes it possible to quickly and easily pull out a dented sheet metal portion of an automobile or the like, in such manner that the dented metal will be returned to substantially its original shape or configuration without the metal being stretched during this procedure beyond its said original shape or configuration.

An additional object is to provide such a device having novel selectable means in the form of one or more separate rigid plates, each of which is adapted to serve as a separable base-like member of the device and is provided with a surface area that conforms with, or is in substantial correspondence with, the original surface area of a dented sheet metal portion to be restored.

Another object is to provide such a device which includes a plurality of separate and different device base-forming plates each of which is provided with an aperture arrangement adapted to facilitate assembly of a selected plate with the other parts of the device and use of the latter in pulling out dented sheet metal portions that originally had various surface configurations, such as a straight or a curved surface configuration, or one which is close to a raised ornamental strip or the like so as to necessitate positioning of an edge of the base-forming plate in close adjacent relationship with such raised strip.

It is also an object to provide such a device which is simple and rugged in its construction as well as effective and efficient in its operation.

An additional object is to provide such a device which comprises a combination of parts such as a rigid plate-like base member provided with a plurality of apertures arranged in a certain order, a substantially U-shaped frame member having two longitudinally extending legs that are connected with each other intermediately of their ends by a transversely extending brace element, means separably connecting said members, a crank having a shank portion rotatably mounted on said frame member in substantially central longitudinally extending relation between the legs thereof and a socket separably connected with the front end of the crank which socket is adapted to have removably anchored therein the head of a metal screw in such manner that the shank portion of the latter extends through and beyond one of the apertures provided in said base member.

With these and other objects in view, which will become more readily apparent from the following detailed description of one practical and illustrative embodiment of my improvements shown in the accompanying drawings, my invention comprises the novel hand tool or device, elements, features of construction and arrangement of parts in cooperative relationship, as more particularly indicated and defined by the hereto appended claims.

In the drawings:

FIGURE 1 is a top plan view of one form of hand tool or device in accordance with my invention.

FIG. 2 is a rear elevational view of the device of FIG. 1.

FIG. 3 is a front elevational view of the device of FIG. 1.

FIGS. 4 and 5 are, respectively, a top or edge view and a rear elevational view of a certain base-forming element that constitutes a part of my invention.

FIGS. 6 and 7 are, respectively, a top or edge view and a rear elevational view of another base-forming element that constitutes a part of my invention.

FIG. 8 is a side elevational view of the device shown in FIGS. 1, 2 and 3.

FIG. 9 is an elevational sectional view, on an enlarged scale, taken substantially as indicated by the arrows 9—9 on FIG. 8.

FIG. 10 is a transverse sectional view, on an enlarged scale, taken substantially as indicated by the arrows 10—10 on FIG. 8.

FIG. 11 is a side elevational view, on an enlarged scale, of a certain screw holding socket element of my invention.

FIG. 12 is a front elevational view of the socket element shown in FIG. 11.

FIG. 13 is an enlarged detail sectional view, taken substantially as indicated by the arrows 13—13 on FIG. 2.

By referring to FIGS. 1, 2, 3 and 8 to 12 inclusive, it is to be noted that the component parts of the device of my invention there shown are preferably made of metal and generally comprise a straight, flat, plate-like base member 1, a substantially U-shaped frame member 2 (see FIG. 8), a crank 3, a socket 4, a retaining collar 5, a washer 6, a metal screw 7, having a hexagonal head $7^a$, and a pair of similar fastening units each of which comprises a screw 8 having a flared head $8^a$, and a wing nut 9.

As more particularly indicated in FIGS. 3, 10 and 13, the base member 1 is provided along its longitudinal center line with three relatively spaced apertures, a centrally located aperture 10, and two outer apertures 11 that are countersunk.

The frame member 2 comprises a pair of longitudinally extending legs $2^a$, $2^a$, that are connected with each other at one end by an integral transversely extending member $2^b$, and the other ends of which legs are each provided with a right-angularly extending foot portion $2^c$.

As clearly shown in FIGS. 8 and 9, a brace element or plate 12 is arranged to extend transversely between the legs $2^a$, $2^a$, of the frame member 2, the ends of which element 12 may be rigidly secured to said legs in any suitable and practical manner, as by welding indicated at 13.

The transversely extending end member $2^b$ of the frame member 2, and the brace element 12, are each provided with a similar central bearing forming aperture for the extension therethrough and rotation therein of the shank portion $3^a$ of the crank 3.

As clearly shown in FIGS. 10 and 12, the forward end of the shank portion $3^a$ is provided with an integral extension $3^b$ of square cross-sectional configuration which is adapted to be inserted into the square opening $4^a$ formed in the rear section of the socket 4. The forward section of the socket 4 is provided with an opening $4^b$ of hexagonal cross-sectional configuration, as indicated in FIG. 12, for the insertion therein of the hexagonal head $7^a$ of the metal screw 7. In this manner, the crank 3, socket 4 and screw 7 are separably united with each other, for turning movement in unison, so that when the crank 3 is rotatably operated it will revolve the screw 7.

The washer 6 is interposed between the forward end of the socket 4 and the rear surface of the base plate 1, to thereby retain the hexagonal head 7ª of the metal screw 7 within the socket 4 and to provide for free and easy rotation of the socket 4 relative to the base plate 1.

As indicated in FIGS. 8 and 9, the retaining collar 5 is secured to the shank portion 3ª of the crank 3, by a socket wrench operated or Allen type set screw 14, the inner end of which abuts against a flat surface section 3ᶜ of the shank portion 3ª. The arrangement of retaining collar 5 and washer 6, prevent axial movement of the crank 3 relative to the frame member 2, when the device is assembled as shown in FIG. 8.

The base member or plate 1 is fixedly secured to the foot portions 2ᶜ of the frame member 2, by the two previously mentioned similar fastening units, each of which comprises a screw 8 and a wing nut 9. As will be clear from FIG. 13, each screw 8 is inserted through the countersunk aperture 11 in the base member 1 from the front of the latter, so that when the screws 8 are properly seated, the front surface of the flared heads thereof will be flush with the front surface of the base member 1. The shanks of the screws 8 extend through suitable apertures 2ᵉ provided therefor in the foot portions 2ᶜ of the frame member 2 and have the wing nuts tightly applied to the ends thereof so as to securely hold together the base member 1 and the frame member 2 in the relationship indicated by FIGS. 1, 2, 3 and 8.

To extend the usefulness of my device, a plurality of separate modified base-forming members or plates may be provided therewith, such as those illustrated by FIGS. 4, 5, 6 and 7. These modified plates may be selectively used and can be readily substituted for the base-forming plate 1 of the described form of my device by means of the fastening units comprising screws 8 and wing nuts 9. The modified base plate identified by the reference character 1ª in FIGS. 4 and 5, differs from the base plate 1 previously described only in that the plate 1ª is transversely curved, as shown, so that it can be substituted for use with my device when a dented sheet metal portion is to be restored the surface of which initially was curved in substantial correspondence with the curvature of the plate 1ª. The plate 1ª is provided with three apertures 10ª and 11ª, 11ª, which correspond with the apertures 10 and 11, 11 of my device previously described.

The modified base plate identified by the reference character 1ᵇ in FIGS. 6 and 7 differs from the base plate 1 previously described, mainly in that, besides having a central arrangement of three apertures 10ᵇ and 11ᵇ, 11ᵇ, in correspondence with the apertures 10 and 11, 11, of the plate 1, it also has a second series of such apertures 10ᶜ and 11ᶜ, 11ᶜ, arranged in parallelism and close proximity with one edge of the base plate 1ᵇ. By providing the base plate 1ᵇ with two rows of apertures as shown, the other component parts of my device can be readily cooperatively combined therewith as heretofore described, either centrally thereof, or adjacent one edge thereof. Accordingly, the metal screw 7 can be projected for use in selective manner at two different locations of the plate 1ᵇ, either through the aperture 10ᵇ or the aperture 10ᶜ, for a purpose which will become clear from the following description of the operation of my device.

Operation

In operation, a substantial saving in time and effort is effected by the use of my device when utilizing the same in restoring the dented metal portions of an automobile or the like.

Such automobile parts as dented fenders, door panels, body panels, etc., can be readily straightened by the simple pull-out action of my device which is exerted from the outside. This action avoids the necessity of removing and replacing interior or underlying parts, such as mechanical parts, upholstery, etc., a procedure which accounts for a large percentage of the total labor time and expense normally involved in any repair job requiring the restoration and refinishing of dented portions of automobiles and the like.

Since my device is of light weight construction, it can also be easily handled by a workman and quickly placed in proper position relative to a dented or deformed section of a sheet metal portion to be restored.

To make clear the pull-out action performed by my device, I have indicated in FIG. 8 a straight sheet metal portion of an automobile by dot-and-dash lines M and a dented section thereof by the letter D.

The procedure followed in pulling out the dented section D of the sheet metal portion M is substantially as follows:

A standard or conventional punch implement (not shown) is first utilized to punch one or more small holes H through the dented section D of the sheet metal portion M, wherever it is considered expedient by the operator of my device to exert a pulling force on the dented section so as to effect the return thereof to its original configuration.

My device is then seated on, or against the metal portion M, as shown in FIG. 8, so that the straight base plate 1 bridges the dent. The tip portion of the metal screw 7 of the device is then projected through the hole H. The crank 3 is then rotated sufficiently to effect firm engagement of the screw tip with the hole defining wall of the dented section D of the metal portion M and rotation of the crank 3 is then continued so that the spiral screw thread, by rotation, will exert a pulling action on the dented section D of the metal portion M until said section is drawn against the base plate 1 of the device as indicated at D¹ in FIG. 8.

Having accomplished its purpose, the device may be quickly disconnected from the portion M by reverse rotation of the crank 3 to thereby effect removal of the screw 7 from its engagement in the aperture H.

The straightened metal portion M is then surface finished in the usual well known manner of the prior art practice.

If the surface area of the metal portion M, in which a dented section D is located, has an outer curved configuration similar to that of the base plate 1ª shown in FIGS. 4 and 5, then such curved base plate 1a is substituted for the base plate 1 of the device, so that conformity exists, as before, between the outer surface area of the metal portion M and the surface of the base plate 1ª.

If the dented section D of the metal portion M is located close to an automobile molding, or an ornamental strip, which molding or strip has a raised surface in relation to the surface of the metal portion M, then the base plate 1ᵇ of FIG. 7 can be utilized to advantage with my device. By connecting the foot portions 2ᶜ of the frame member 2 with the base plate 1ᵇ at the location of the apertures 11ᶜ, 11ᶜ, the upper edge of the base plate 1ᵇ can be arranged in close proximity to the raised surface of said molding or ornamental strip and the device operated as before.

It is to be particularly noted that the base plates 1, 1ª and 1ᵇ, in each instance, provide a stop surface against which the dented section is pulled and that this prevents the metal from being stretched by my device beyond its original shape or configuration. This feature of my device eliminates the usual difficulties and time required to reduce and reshape a metal section that has been stretched beyond its original shape.

Modifications

Of course, it will be understood by those skilled in this art that the device as shown and described, can be changed and modified in various ways without departing from the invention herein disclosed and more particularly defined by the hereto appended claims. For example, the metal screw 7 can be provided in one length or another, or a plurality of such screws of different length can be furnished with my device. Also, the base members 1, 1ª and 1b can obviously be provided in different size and shapes, if desired, or required to adapt the device for other or special uses, similar to those for which the device is designed.

I claim:
1. A device of the character described comprising; a rigid plate-like base member having at least one aperture extending therethrough; a substantially U-shaped frame member having two longitudinally extending legs; means separably connecting said members; a crank having a shank portion rotatably mounted on said frame member in longitudinally fixed relation between the legs thereof; and a socket separably connected with the front end of the crank, which socket is adapted to have anchored therein the head of a metal screw in such manner that the shank portion of the latter extends through and beyond one of the apertures in said base member for engagement with a work piece.

2. A device in accordance with claim 1, wherein the means separably connecting said members includes a pair of screw and wing nut units.

3. A device in accordance with claim 1, wherein the front end portion of the crank is of square cross-sectional configuration.

4. A device in accordance with claim 1, wherein said socket is provided with a longitudinally extending hollow section of hexagonal cross-sectional configuration and a longitudinally extending hollow section of square cross-sectional configuration.

5. A device in accordance with claim 1, which includes means arranged to maintain the crank against axial movement on the frame member.

6. A device in accordance with claim 1, wherein the said rigid base member is in the form of a metallic plate having a plurality of apertures extending therethrough which are arranged in a certain spaced relation with each other.

7. A device in accordance with claim 1, wherein the said rigid base member is in the form of a rectangular metallic plate of curved transverse sectional configuration having a plurality of apertures extending therethrough and arranged in spaced relation along the longitudinal center line thereof.

8. A device in accordance with claim 1, wherein the said rigid base member is in the form of a metallic plate having a plurality of apertures extending therethrough and arranged in a line that extends in parallelism with and close proximity to an edge of the plate.

9. A device in accordance with claim 1, wherein the front end of said metal screw is firmly engageable with a punched out wall portion that defines an aperture provided in a dented section of the work piece and when rotated said screw will cause said section to be pulled toward the base member by effecting travel of said wall portion along the threads of the metal screw.

References Cited by the Examiner
UNITED STATES PATENTS

| | | | |
|---|---|---|---|
| 2,749,795 | 6/56 | Boykin | 81—15 |
| 2,863,489 | 12/58 | Priest | 153—32 |
| 2,941,429 | 6/60 | Mason | 81—15 |
| 3,066,719 | 12/62 | Selnick | 153—32 |

CHARLES L. LANHAM, *Primary Examiner.*